(12) United States Patent
Jeon et al.

(10) Patent No.: US 10,229,620 B2
(45) Date of Patent: *Mar. 12, 2019

(54) DISPLAY PANEL AND DISPLAY APPARATUS HAVING THE SAME

(71) Applicant: Samsung Display Co., Ltd., Yongin, Gyeonggi-do (KR)

(72) Inventors: Sangjin Jeon, Suwon-si (KR); Ilgon Kim, Seoul (KR); Dong-Won Park, Hwaseong-si (KR); Bonghyun You, Yongin-si (KR); Junki Jeong, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 660 days.

This patent is subject to a terminal disclaimer.

(21) Appl. No.: 14/604,636

(22) Filed: Jan. 23, 2015

(65) Prior Publication Data

US 2015/0348455 A1 Dec. 3, 2015

(30) Foreign Application Priority Data

Jun. 2, 2014 (KR) ........................ 10-2014-0067088

(51) Int. Cl.
*G09G 3/36* (2006.01)
*G09G 3/20* (2006.01)
(Continued)

(52) U.S. Cl.
CPC ......... *G09G 3/20* (2013.01); *G02F 1/134336* (2013.01); *G02F 1/136286* (2013.01);
(Continued)

(58) Field of Classification Search
CPC ... G09G 2300/0413; G09G 2300/0426; G09G 3/3648; G09G 3/20
(Continued)

(56) References Cited

U.S. PATENT DOCUMENTS 4,986,637 A 1/1991 Yamaguchi
5,146,356 A 9/1992 Carlson
(Continued)

FOREIGN PATENT DOCUMENTS

CN 1554970 A 12/2004
CN 1941047 A 4/2007
(Continued)

*Primary Examiner* — Michael Pervan
(74) *Attorney, Agent, or Firm* — Lewis Roca Rothgerber Christie LLP

(57) ABSTRACT

A display apparatus includes a display panel, a timing controller, a gate driver, and a data driver. The display panel includes a display area configured to display an image and a non-display area adjacent to a side of the display area in a first direction. The display area includes gate lines, data lines, gate dummy lines, data contact parts, and pixels. The data lines cross the gate lines and are insulated from at least a portion of the gate lines. The gate dummy lines are substantially in parallel to the gate lines and spaced from the gate lines. The data contact parts couple the gate dummy lines to the data lines at a side of the display panel in a second direction substantially perpendicular to the first direction. The pixels are coupled to the gate lines and the data lines.

26 Claims, 8 Drawing Sheets

(51) Int. Cl.
  *G02F 1/1362* (2006.01)
  *G02F 1/1343* (2006.01)
  *G02F 1/1345* (2006.01)
(52) U.S. Cl.
  CPC . *G09G 3/3648* (2013.01); *G02F 2001/13456* (2013.01); *G02F 2001/13629* (2013.01); *G09G 2300/0413* (2013.01); *G09G 2300/0426* (2013.01); *G09G 2300/0439* (2013.01); *G09G 2310/0278* (2013.01)
(58) Field of Classification Search
  USPC .................................................. 345/76–107
  See application file for complete search history.

(56) References Cited

U.S. PATENT DOCUMENTS

| | | | |
|---|---|---|---|
| 6,496,238 B1 | 12/2002 | Greene et al. | |
| 6,654,449 B1 | 11/2003 | Greene et al. | |
| 6,787,987 B2 | 9/2004 | Duineveld et al. | |
| 6,798,475 B2 | 9/2004 | Ho et al. | |
| 6,933,998 B1 | 8/2005 | Iwahashi | |
| 7,479,642 B2 | 1/2009 | Maack | |
| 8,035,711 B2 | 10/2011 | Liu et al. | |
| 8,111,298 B2 | 2/2012 | Kameya | |
| 8,339,430 B2 | 12/2012 | Choi et al. | |
| 9,472,147 B2 | 10/2016 | Park | |
| 2002/0070912 A1 | 6/2002 | Asuma et al. | |
| 2002/0154076 A1 | 10/2002 | Greene et al. | |
| 2002/0171437 A1 | 11/2002 | Im | |
| 2003/0067429 A1 | 4/2003 | Aoki et al. | |
| 2006/0070274 A1 | 4/2006 | Maack | |
| 2006/0164350 A1 | 7/2006 | Kim et al. | |
| 2007/0064165 A1* | 3/2007 | Lee | G02F 1/136204 349/40 |
| 2007/0109469 A1 | 5/2007 | Jeon et al. | |
| 2007/0146611 A1 | 6/2007 | Kang | |
| 2007/0165149 A1 | 7/2007 | Kim et al. | |
| 2008/0048934 A1 | 2/2008 | Yamamoto et al. | |
| 2008/0068324 A1* | 3/2008 | Chung | G09G 3/006 345/98 |
| 2008/0158124 A1* | 7/2008 | Kim | G09G 3/3648 345/92 |
| 2008/0158452 A1* | 7/2008 | Wu | G02F 1/133753 349/34 |
| 2008/0316379 A1 | 12/2008 | Zuidema et al. | |
| 2010/0020053 A1 | 1/2010 | Sah | |
| 2010/0171737 A1 | 7/2010 | Bae et al. | |
| 2010/0238148 A1 | 9/2010 | Sah | |
| 2010/0295764 A1 | 11/2010 | Wang et al. | |
| 2011/0174957 A1 | 7/2011 | Okada | |
| 2012/0081352 A1* | 4/2012 | Yamagishi | G09G 3/3614 345/212 |
| 2014/0152938 A1 | 6/2014 | Lee et al. | |
| 2015/0138473 A1 | 5/2015 | Zhang | |
| 2015/0262554 A1 | 9/2015 | Park et al. | |
| 2015/0348455 A1 | 12/2015 | Jeon et al. | |
| 2016/0035298 A1 | 2/2016 | Qin et al. | |

FOREIGN PATENT DOCUMENTS

| | | |
|---|---|---|
| CN | 1963618 A | 5/2007 |
| CN | 101004520 A | 7/2007 |
| CN | 103454822 A | 12/2013 |
| EP | 0 293 048 A2 | 11/1988 |
| JP | 2001-075508 A | 3/2001 |
| JP | 2004-341330 A | 12/2004 |
| JP | 5189276 B2 | 6/2008 |
| JP | 4349310 B2 | 10/2009 |
| KR | 10-2004-0061188 A | 7/2004 |
| KR | 10-2005-0015163 A | 2/2005 |
| KR | 10-1026802 B1 | 5/2005 |
| KR | 10-0964586 B1 | 6/2010 |
| KR | 10-2011-0042674 A | 4/2011 |
| KR | 10-1142996 B1 | 5/2012 |
| KR | 10-2015-0047400 | 5/2015 |
| KR | 10-2015-0066313 | 6/2015 |
| KR | 10-2015-0107943 | 9/2015 |
| KR | 10-2015-0139131 | 12/2015 |

* cited by examiner

DISPLAY PANEL AND DISPLAY APPARATUS HAVING THE SAME

CROSS-REFERENCE TO RELATED APPLICATION

This patent application claims priority to and the benefit of Korean Patent Application No. 10-2014-0067088, filed on Jun. 2, 2014, the content of which is hereby incorporated by reference in its entirety.

BACKGROUND

1. Field

Aspects of the present disclosure are directed toward a display panel and a display apparatus including the same. More particularly, aspects of the present disclosure are directed toward a display panel capable of reducing a non-display area and a display apparatus including the display panel.

2. Description of the Related Art

In recent years, various display apparatuses, such as a liquid crystal display, an electrophoretic display, an organic light emitting display, etc., are widely used (e.g., utilized) to replace a cathode ray tube display.

The display apparatus includes a display panel, a gate driver, and a data driver. The display panel includes a display area for displaying an image and a non-display area surrounding the display area. The display panel further includes gate lines, data lines, and pixels, each pixel being coupled (e.g., connected) to a corresponding gate line of the gate lines and a corresponding data line of the data lines.

The display panel has a rectangular shape defined by first sides extending along a first direction and second sides extending along a second direction substantially perpendicular to the first direction. The data lines extend along the first direction and are substantially in parallel to each other, and the gate lines extend along the second direction and are substantially in parallel to each other.

The gate driver is mounted on a printed circuit board coupled to the non-display area of the display panel in the second direction as a driving chip, or directly formed on the non-display area of the display panel in the second direction through a thin film process.

In recent years, research for the display panel have been performed on a narrow bezel structure, as demand for the narrow bezel structure has been increasing in the market. However, there is a limitation for reducing the non-display area of the display panel due to the position of the gate driver.

SUMMARY

An aspects of an embodiment of the present disclosure provides a display panel capable of reducing a non-display area.

An aspect of an embodiment of the present disclosure provides a display apparatus having the display panel.

An embodiment of the inventive concept provides a display apparatus including: a display panel including a display area configured to display an image and a non-display area adjacent to a side of the display area in a first direction; a timing controller configured to receive a control signal and an input image signal, and to output a first control signal, a second control signal, and a data signal; a gate driver configured to generate a gate signal in response to the first control signal, and to apply the gate signal to gate lines from the non-display area; and a data driver configured to convert the data signal to a data voltage in response to the second control signal, and to apply the data voltage to data lines from the non-display area. The display area includes: the gate lines; the data lines crossing the gate lines and insulated from at least a portion of the gate lines; gate dummy lines substantially in parallel to the gate lines and spaced from the gate lines; data contact parts coupling the gate dummy lines to the data lines at a side of the display panel in a second direction substantially perpendicular to the first direction; and pixels coupled to the gate lines and the data lines.

The gate dummy lines may be at a same layer as the gate lines.

One of the gate dummy lines coupled to one of the data lines by one of the data contact parts may be overlapped with the one of the data lines when viewed in a plan view.

The display area may further include: data dummy lines substantially in parallel to the data lines and spaced from the data lines; and gate contact parts coupling the data dummy lines to the gate lines at another side of the display panel in the second direction.

One end of each of the gate dummy lines may be respectively coupled to the data contact parts, another end of each of the gate dummy lines may be at the non-display area, one end of each of the data dummy lines may be respectively coupled to the gate contact parts, and another end of each of the data dummy lines may be at the non-display area.

The data dummy lines may be at a same layer as the data lines.

One of the data dummy lines coupled to one of the gate lines by one of the gate contact parts may be overlapped with the one of the gate lines when viewed in a plan view.

The display panel may include two sides respectively extending along the first and second directions, the gate lines may extend along a third direction crossing the first and second directions, and the data lines may extend along a fourth direction crossing the first, second, and third directions.

The pixels coupled to one gate line or one data line among the pixels may be defined as a pixel row, the display area may further include a plurality of areas each of the areas being divided into a plurality of pixel rows that may be consecutively arranged, and a number of the pixels included in one pixel row may be different from a number of the pixels included in another pixel row in at least one area from among the areas.

The pixel row may include a gate pixel row including the pixels coupled to one gate line, and the gate dummy line between an n-th gate pixel row (n is a natural number) and an (n+1)th gate pixel row from among the gate dummy lines may be coupled to the data line coupled to a first pixel of the (n+1)th gate pixel row from among the data lines.

The pixel row may include a data pixel row including the pixels coupled to one data line, and the data dummy line between an n-th data pixel row (n is a natural number) and an (n+1)th data pixel row from among the data dummy lines may be coupled to the gate line coupled to a last pixel of the (n+1)th data pixel row from among the gate lines.

The plurality of areas may include: an increase area in which the number of the pixels included in each pixel row increases every at least one pixel row; a maintain area in which the number of the pixels included in each pixel row is constant, and a decrease area in which the number of the pixels included in each pixel row decreases every at least one pixel row.

Each of the pixels may include k (k is a natural number greater than or equal to 2) sub-pixels, each of the data lines may include k sub-data lines, each of the gate dummy lines may include k sub-gate dummy lines respectively coupled to the sub-data lines, and the data contact parts may include k sub-data contact parts to couple the k sub-data lines to the k sub-gate dummy lines, respectively.

The sub-pixels may be adjacent to each other in a same direction as a direction along which the gate lines extend.

The sub-gate dummy lines may be spaced from each other and substantially in parallel to each other.

The sub-pixels may include a first sub-pixel, a second sub-pixel, and a third sub-pixel; the sub-data lines may include a first sub-data line coupled to the first sub-pixel, a second sub-data line coupled to the second sub-pixel, and a third sub-data line coupled to the third sub-pixel; the sub-gate dummy lines may include a first sub-gate dummy line coupled to the first sub-data line, a second sub-gate dummy line coupled to the second sub-data line, and a third sub-gate dummy line coupled to the third sub-data line; and the sub-data contact part may include a first sub-data contact part to couple the first sub-data line to the first sub-gate dummy line, a second sub-data contact part to couple the second sub-data line to the second sub-gate dummy line, and a third sub-data contact part to couple the third sub-data line to the third sub-gate dummy line.

The first, second, and third sub-pixels may be sequentially arranged, the first sub-gate dummy line may be longer than the second sub-gate dummy line, and the second sub-gate dummy line may be longer than the third sub-gate dummy line.

A distance between the gate line coupled to the first, second, and third sub-pixels and the first sub-gate dummy line may be greater than a distance between the gate line coupled to the first, second, and third sub-pixels and the second sub-gate dummy line, and a distance between the gate line coupled to the first, second, and third sub-pixels and the second sub-gate dummy line may be greater than a distance between the gate line coupled to the first, second, and third sub-pixels and the third sub-gate dummy line.

The display panel may further include: a common storage line along an outer portion of the display area and configured to receive a common voltage; and storage lines coupled to the common storage line, extending substantially in parallel to the gate lines, and spaced from the gate lines.

Each of the storage lines may overlap with a pixel row including the pixels coupled to one gate line.

Another embodiment of the inventive concept provides a display panel including: a display area configured to display an image; and a non-display area adjacent to a side of the display area in a first direction, the display area including: gate lines; data lines crossing the gate lines and insulated from at least a portion of the gate lines; gate dummy lines substantially in parallel to the gate lines and spaced from the gate lines; data contact parts coupling the gate dummy lines and the data lines at a side of the display panel in a second direction substantially perpendicular to the first direction; and pixels coupled to the gate lines and the data lines.

The gate dummy lines may be at a same layer as the gate lines.

One of the gate dummy lines coupled to one of the data lines by one of the data contact parts may be overlapped with the one of the data lines when viewed in a plan view.

The display area may further include: data dummy lines substantially in parallel to the data lines and spaced from the data lines; and gate contact parts coupling the data dummy lines to the gate lines at another side of the display panel in the second direction.

One end of each of the gate dummy lines may be respectively coupled to the data contact parts, another end of each of the gate dummy lines may be at the non-display area, one end of each of the data dummy lines may be respectively coupled to the gate contact parts, and another end of each of the data dummy lines may be at the non-display area.

The data dummy lines may be at a same layer as the data lines.

One of the data dummy lines coupled to one of the gate lines by one of the gate contact parts may be overlapped with the one of the gate lines when viewed in a plan view.

According to an aspect of an embodiment of the present disclosure, the bezel of the display panel may be reduced. Consequently, the non-display area of the display panel may be removed, minimized, or reduced, except for the non-display area adjacent to one side of the display panel.

BRIEF DESCRIPTION OF THE DRAWINGS

The above and other aspects and features of the present disclosure will become apparent to those skilled in the art by reference to the following detailed description when considered in conjunction with the accompanying drawings wherein.

DETAILED DESCRIPTION

Figure 1:
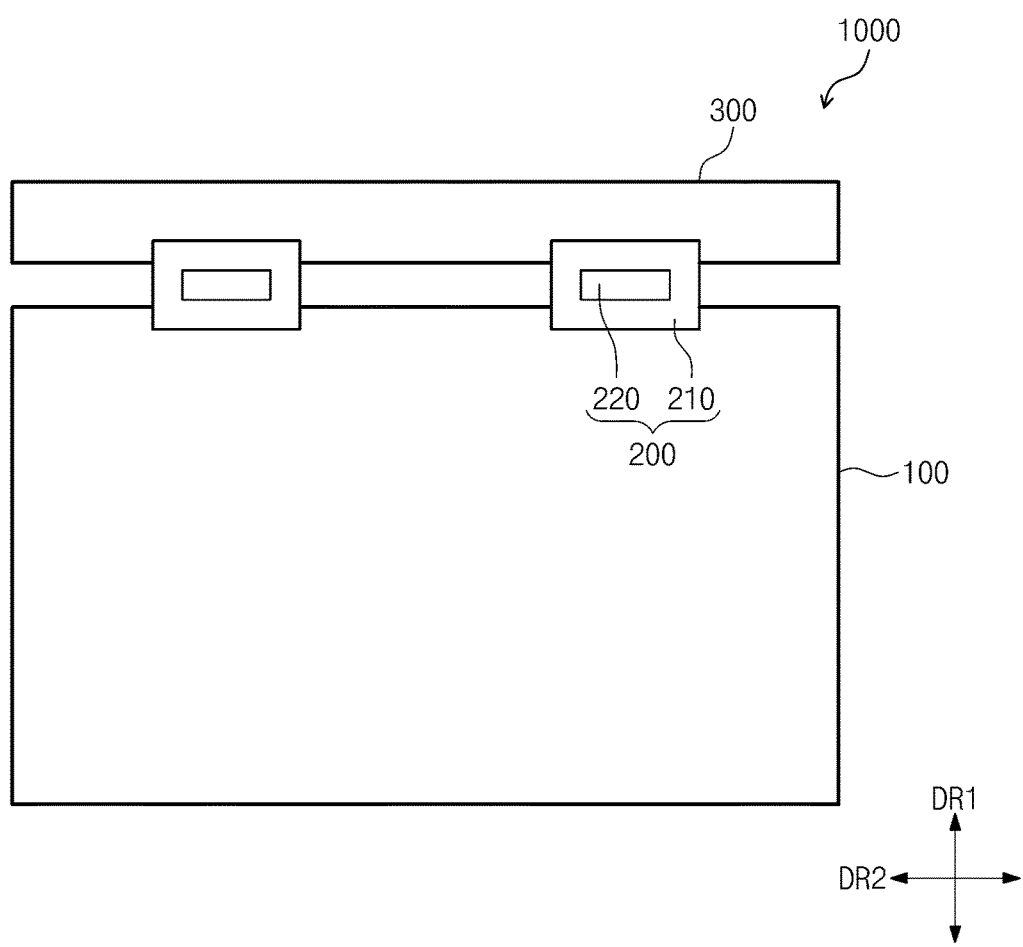
FIG. 1 is a plan view showing a display apparatus according to an example embodiment of the present disclosure.

It will be understood that when an element or layer is referred to as being "on", "connected to" or "coupled to" another element or layer, it can be directly on, directly connected to or directly coupled to the other element or layer, or one or more intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section described below could be termed a second element, component, region, layer or section without departing from the spirit and scope of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of the stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art, and should not be interpreted in an idealized or overly formal sense, unless expressly so defined herein.

Hereinafter, example embodiments of the present invention will be described in detail with reference to the accompanying drawings.

Figure 2:
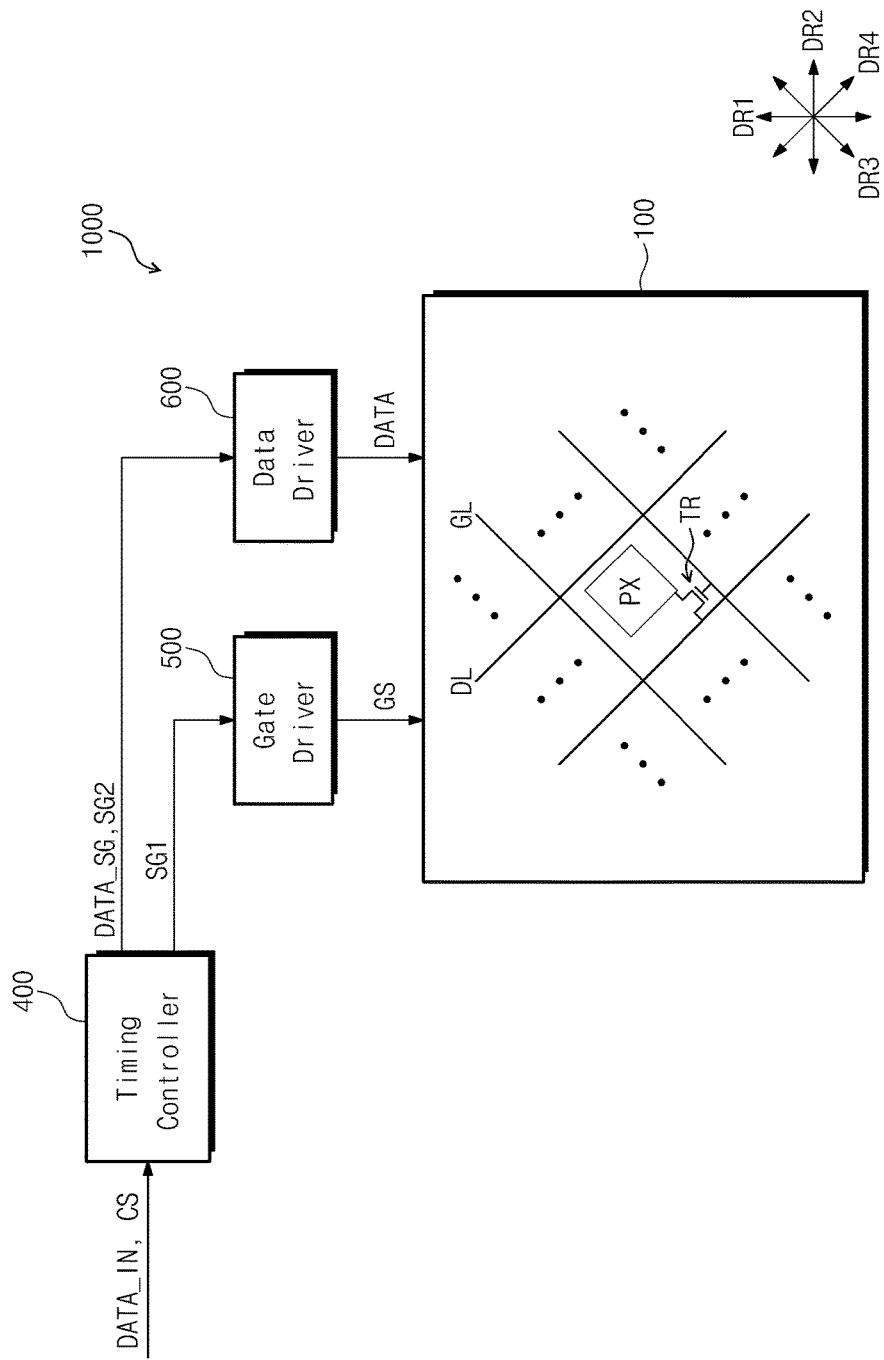
FIG. 2 is a block diagram showing the display apparatus shown in FIG. 1.

FIG. 1 is a plan view showing a display apparatus 1000 according to an example embodiment of the present disclosure, and FIG. 2 is a block diagram showing the display apparatus 1000 shown in FIG. 1.

Referring to FIGS. 1 and 2, the display apparatus 1000 includes a display panel 100, a flexible circuit board 200, a printed circuit board 300, a timing controller 400, a gate driver 500, and a data driver 600.

The display panel 100 may be, but not limited to, an organic light emitting display panel, a liquid crystal display panel, a plasma display panel, an electrophoretic display panel, or an electrowetting display panel.

The display panel 100 displays an image. The display panel 100 includes gate lines GL, and data lines DL insulated from the gate lines GL and crossing the gate lines GL. The display panel 100 includes thin film transistors TR, each being coupled to (e.g., connected to) a corresponding gate line of the gate lines GL and a corresponding data line of the data lines DL, and pixels PX respectively coupled to the thin film transistors TR. The thin film transistor TR includes a gate electrode, a source electrode, and a drain electrode. The gate electrode of the thin film transistor TR receives a gate signal GS from the corresponding gate line GL. The source electrode of the thin film transistor TR receives a data voltage DATA from the corresponding data line DL. The drain electrode of the thin film transistor TR is coupled to the pixel PX. The thin film transistor TR is turned on in response to the gate signal GS, and applies the data voltage DATA to the pixel PX.

The gate line GL receives the gate signal GS provided from the gate driver 500, and the data line DL receives the data voltage DATA provided from the data driver 600.

The display panel 100 may have various shapes when viewed in a plan view. In the present example embodiment, the display panel 100 has a rectangular shape. Hereinafter, a short side direction of the display panel 100 is referred to as a first direction DR1, and a long side direction of the display panel 100 is referred to as a second direction DR2.

The flexible circuit board 200 electrically couples (e.g., electrically connects) the display panel 100 to the printed circuit board 300. The flexible circuit board 200 includes a base film 210 and an integrated circuit chip 220 disposed on the base film 210.

One end in the first direction DR1 of the flexible circuit board 200 is electrically coupled to the display panel 100 and the other end in the first direction DR1 of the flexible circuit board 200 is electrically coupled to the printed circuit board 300.

FIG. 1 shows two flexible circuit boards 200 spaced apart from each other along the second direction DR2, but the number of the flexible circuit boards 200 should not be limited to two.

The flexible circuit board 200 may be flexible. The flexible circuit board 200 may be attached to a rear surface of the display panel 100 and bent in a C-shape.

The printed circuit board 300 drives the display panel 100. The printed circuit board 300 includes a driving substrate and a plurality of circuit elements mounted on the driving substrate. The printed circuit board 300 is mounted on the rear surface of the display panel 100 when the flexible circuit board 200 is bent.

The timing controller 400 receives input image signal DATA_IN and control signals CS from an external graphic controller.

The timing controller 400 receives the control signals CS, e.g., a vertical synchronization signal, a horizontal synchronization signal, a main clock, a data enable signal, etc., and generates a first control signal SG1 and a second control signal SG2.

The timing controller 400 converts the input image signal DATA_IN to a data signal DATA_SG according to specifications of the data driver 600, and applies the data signal DATA_SG to the data driver 600.

The first control signal SG1 includes a gate clock signal, an output enable signal, and a vertical start signal to control an operation of the gate driver 500.

The second control signal SG2 controls an operation of the data driver 600. To this end, the second control signal SG2 includes a horizontal start signal that starts the operation of the data driver 600, an inversion signal that inverts a polarity of the data voltage, and an output indication signal that determines an output timing of the data voltage from the data driver 600.

The gate driver 500 generates the gate signal in response to the first control signal SG1. The gate driver 500 is electrically coupled to the gate lines GL to apply the gate signals to the gate lines GL.

The data driver 600 converts the data signal DATA_SG to the data voltage DATA in response to the second control signal SG2, and applies the data voltage DATA to the data lines DL.

The gate driver 500 and the data driver 600 may be integrated in one integrated chip 220, but they are not limited thereto or thereby. For example, the gate driver 500 and the data driver 600 may be integrated in separate integrated chips and mounted on the flexible circuit board 200, the printed circuit board 300, or the display panel 100.

Figure 3:
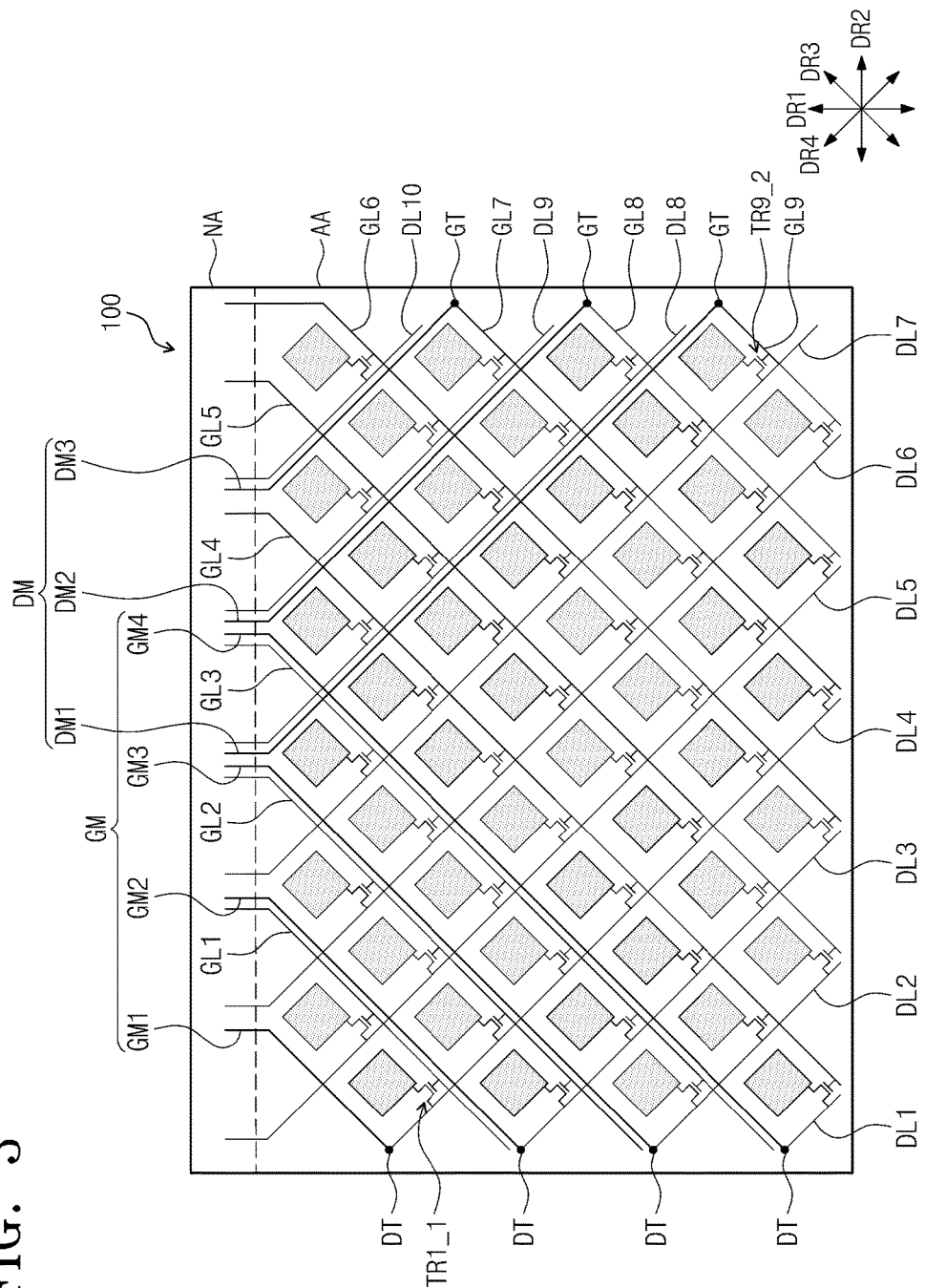
FIG. 3 is a view showing a display panel shown in FIG. 2.
Figure 4:
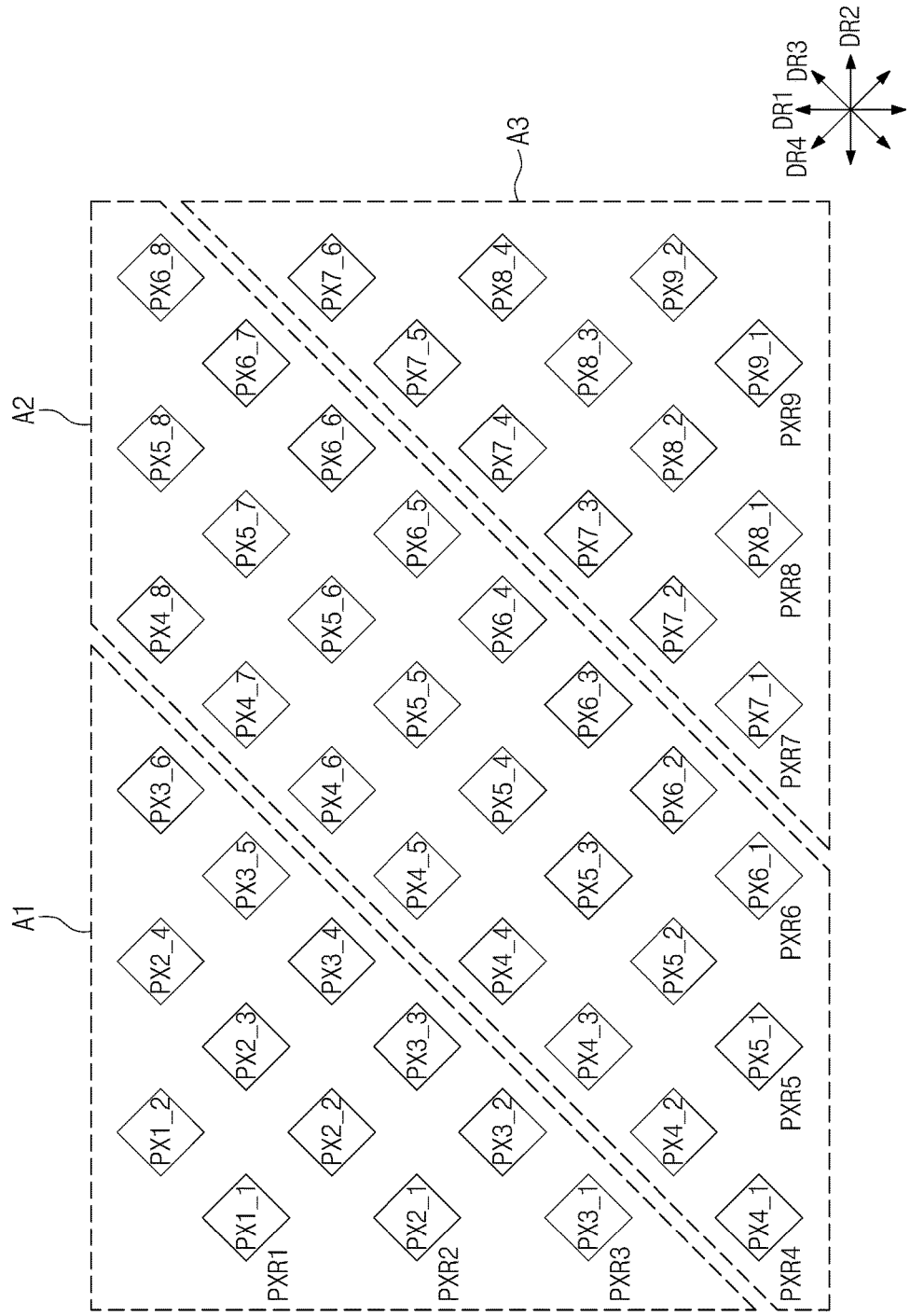
FIG. 4 is a view showing the pixels shown in FIG. 3.

FIG. 3 is a view showing the display panel 100 shown in FIG. 2, and FIG. 4 is a view showing the pixels shown in FIG. 3.

Referring to FIGS. 2 to 4, the display panel 100 includes a display area AA and a non-display area NA. The display area AA displays the image and includes the gate lines GL, the data lines DL, and the pixels PX. The non-display area NA does not display the image and is disposed at an outer portion of the display panel. The non-display area NA is disposed adjacent to an end portion of the display area AA in the first direction DR1. The non-display area NA includes a pad part. The pad part is coupled to (e.g., connected to) the gate lines GL and the data lines DL. The pad part receives the gate signal GS from the gate driver 500 and the data voltage DATA from the data driver 600, and applies the gate signal GS and the data voltage DATA to the gate lines GL and the data lines DL, respectively.

The gate lines GL and the data lines DL extend along a diagonal direction with respect to the first and second directions DR1 and DR2. The phrase that the gate lines GL and the data lines DL extend along the diagonal direction refers to not only that the gate lines GL and the data lines DL extend with a straight line shape along the diagonal direction, but also that the gate lines GL and the data lines DL extend with a zigzag shape along the diagonal direction.

The gate lines GL extend along a third direction DR3 crossing the first and second directions DR1 and DR2, and the data lines DL extend along a fourth direction DR4 crossing the first, second, and third directions DR1, DR2, and DR3. An angle between the third direction DR3 and the fourth direction DR4 may be variously set (e.g., to angles of about 30 degrees, about 45 degrees, or about 60 degrees). Hereinafter, in the present example embodiment, the third direction DR3 and the fourth direction DR4 are substantially perpendicular to each other.

FIG. 3 shows first to ninth gate lines GL1 to GL9 and first to tenth data lines DL1 to DL10 as representative examples, but the number of the gate lines GL and the number of the data lines DL are not limited thereto or thereby.

The pixels PX are respectively disposed in pixel areas defined by the first to ninth gate lines GL1 to GL9 and the first to tenth data lines DL1 to DL10. In the present example embodiment, each pixel PX has a lozenge shape when viewed in a plan view as shown in FIGS. 3 and 4, but the shape of the pixels PX is not limited to the lozenge shape. That is, the shape of the pixels PX may vary depending on the gate lines GL and the data lines DL.

Among the pixels PX, pixels coupled to one gate line GL or one data line DL are referred to as a pixel row. The pixel row includes a gate pixel row including the pixels coupled to one gate line, and a data pixel row including the pixels coupled to one data line. The gate pixel rows include first to ninth gate pixel rows PXR1 to PXR9.

Hereinafter, when a specific one of the pixels is indicated, a number of the gate pixel row, in which the specific one of the pixels is included, will be provided together with a number of the specific one of the pixels, which represents a position of the specific one of the pixels in a direction from a lower-left direction to an upper-right direction. For example, a pixel PX1_1 coupled to the first gate line GL1 and the fourth data line DL4 is referred to as a first-row first pixel PX1_1, since the pixel PX1_1 corresponds to the first pixel in the first pixel row.

Similarly, the thin film transistor coupled to the first-row first pixel PX1_1 is referred to as a first-row first thin film transistor TR1_1.

In FIGS. 3 and 4, the pixels PX1_1 to PX9_2, including forty eight pixels arranged in the first to ninth pixel rows, have been shown. In addition, the thin film transistors include forty eight thin film transistors TR1_1 to TR9_2, respectively coupled to the pixels PX1_1 to PX9_2.

Among two pixel rows adjacent to each other, the number of the pixels arranged in one pixel row may be different from the number of the pixels arranged in the other pixel row. The display area AA includes an increase area A1, a maintain area A2, and a decrease area A3, which are defined by the increase, maintain, or decrease in number of the pixels included in each pixel row of the two adjacent pixel rows. Hereinafter, the gate pixel row will be described in detail.

The increase area A1 includes the first to third pixel rows PXR1 to PXR3. The number of the pixels in each pixel row increases in arithmetical progression from the first pixel row PXR1 to the third pixel row PXR3 every at least one pixel row. As shown in FIGS. 3 and 4, the first pixel row PXR1 includes two pixels and the third pixel row PXR3 includes six pixels, since the number of the pixels increases by two pixels every one pixel row. However, the present invention is not limited thereto, and the number of pixels in each pixel row may be increased every plurality of pixel rows. For example, the number of the pixels of the first pixel row may be equal to the number of the pixels of the second pixel row, and the number of pixels of the third pixel row may be greater than the number of the pixels of each of the first and second pixel rows.

The maintain area A2 includes the fourth to sixth pixel rows PXR4 to PXR6. The number of the pixels of the fourth pixel row PXR4 is equal to the number of the pixels of each of the fifth and sixth pixel rows PXR5 and PXR6. In FIGS. 3 and 4, each of the fourth to sixth pixel rows PXR4 to PXR6 includes eight pixels.

The decrease area A3 includes the seventh to ninth pixel rows PXR7 to PXR9. The number of the pixels in each pixel row decreases in arithmetical progression from the seventh pixel row PXR7 to the ninth pixel row PXR9 every at least one pixel row. As shown in FIGS. 3 and 4, the seventh pixel row PXR7 includes six pixels and the ninth pixel row PXR9 includes two pixels since the number of the pixels decreases by two pixels every one pixel row. However, the present invention is not limited thereto, and the number of pixels in each pixel row may be decreased every plurality of pixel rows. For example, the number of the pixels of the seventh pixel row may be equal to the number of the pixels of the eighth pixel row, and the number of pixels of the ninth pixel row may be smaller than the number of the pixels of each of the seventh and tenth pixel rows.

In FIGS. 3 and 4, the number of the pixels included in the increase area A1 is equal to the number of the pixels included in the decrease area A3, but is not limited thereto or thereby. For example, the number of pixels of the increase area A1 may be different from the number of pixels of the decrease area A3 according to the size and shape of the display panel 100.

The display area AA may further include gate dummy lines GM, data dummy lines DM, data contact parts DT, and gate contact parts GT.

The gate dummy lines GM are substantially in parallel to the gate lines GL and spaced apart from the gate lines GL. The gate dummy lines GM extend along the third direction DR3. In the present example embodiment, the gate dummy lines GM include first to fourth gate dummy lines GM1 to GM4.

The data contact parts DT couple (e.g., connect) the gate dummy lines GM to the data lines DL at one end of the display panel in the second direction DR2 of the display area AA.

One of the first to fourth gate dummy lines GM1 to GM4 and one of the data lines DL1 to DL10 coupled to each other are overlapped with each other when viewed in a plan view. For example, the first gate dummy line GM1 and the fourth data line DL4 are coupled to each other and overlapped with each other when viewed in a plan view. The second gate dummy line GM2 and the third data line DL3 are coupled to each other and overlapped with each other when viewed in a plan view. The third gate dummy line GM3 and the second data line DL2 are coupled to each other and overlapped with each other when viewed in a plan view. The fourth gate dummy line GM4 and the first data line DL1 are coupled to each other and overlapped with each other when viewed in a plan view.

One end of each of the gate dummy lines GM1 to GM4 is coupled to the data contact parts DT, and the other end of each of the gate dummy lines GM1 to GM4 is disposed at the non-display area.

Among the gate dummy lines GM1 to GM4, a gate dummy line disposed between an n-th gate pixel row ("n" is a natural number) and an (n+1) gate pixel row is coupled to a data line among the data lines DL1 to DL10, which is coupled to the first pixel of the (n+1)th gate pixel row and is disposed nearest to the data contact parts DT. For example, the second gate dummy line GM2 disposed between the first and second gate pixel rows is coupled to the third data line DL3, which is coupled to the first pixel PX2_1 of the second gate pixel row.

The data dummy lines DM are substantially in parallel to the data lines DL and spaced apart from the data lines DL. The data dummy lines DM extend along the fourth direction DR4. In the present example embodiment, the data dummy lines DM include the first to third data dummy lines DM1 to DM3.

The gate contact parts GT couple the data dummy lines DM to the gate lines GL at the other end of the display panel in the second direction DR2 of the display area AA.

One of the first to third data dummy lines DM1 to DM3 and one of the gate lines GL1 to GL9 coupled to each other are overlapped with each other when viewed in a plan view. For example, the first data dummy line DM1 and the ninth gate line GL9 are coupled to each other and overlapped with each other when viewed in a plan view. The second data dummy line DM2 and the eighth gate line GL8 are coupled to each other and overlapped with each other when viewed in a plan view. The third data dummy line DM3 and the seventh gate line GL7 are coupled to each other and overlapped with each other when viewed in a plan view.

One end of each of the data dummy lines DM1 to DM3 is coupled to the gate contact parts GT, and the other end of each of the data dummy lines DM1 to DM3 is disposed at the non-display area.

Among the data dummy lines DM1 to DM3, a data dummy line disposed between an n-th data pixel row ("n" is a natural number) and an (n+1) data pixel row is coupled to a gate line among the gate lines GL1 to GL9, which is coupled to the last pixel of the (n+1)th data pixel row and disposed nearest to the gate contact parts GT. For example, the third data dummy line DM3 disposed between the first data pixel row including the pixel PX6_8 and the second data pixel row including the pixels PX5_8, PX6_7, PX7_6 is coupled to the seventh gate line GL7, which is coupled to the last pixel PX7_6 of the second data pixel row.

Figure 5:
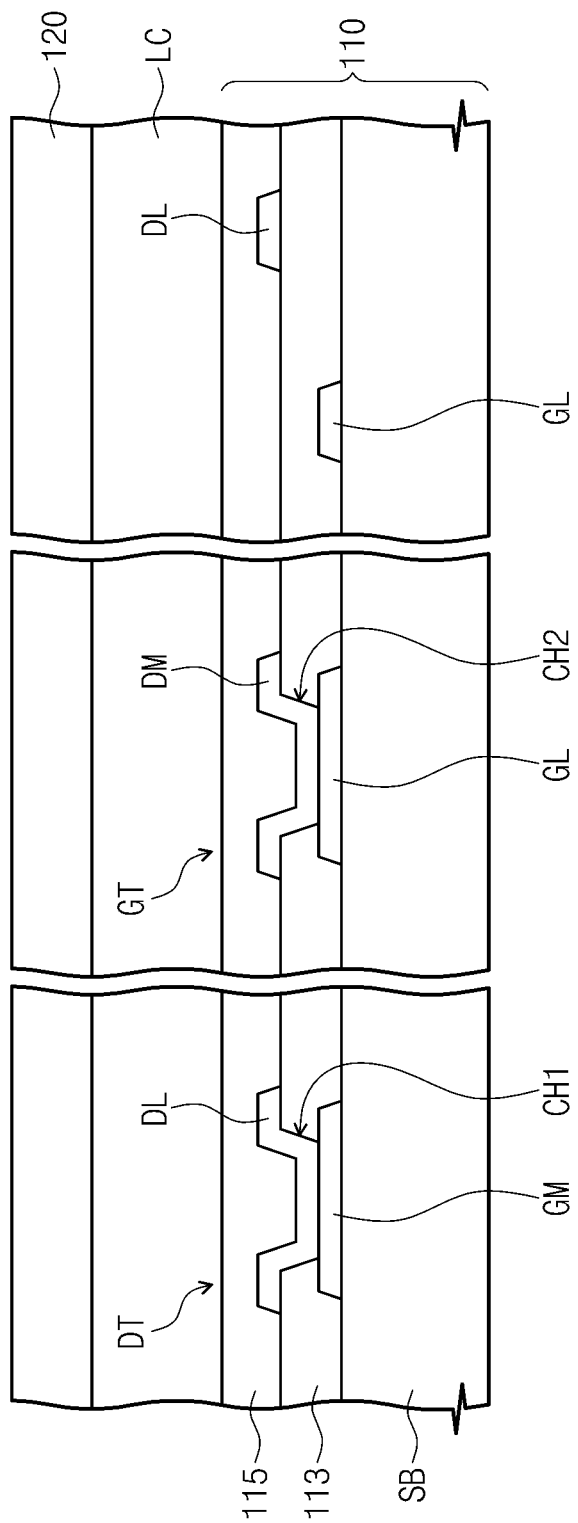
FIG. 5 is a cross-sectional view showing the display panel including a data contact part and a gate contact part shown in FIG. 3.

FIG. 5 is a cross-sectional view showing the display panel including the data contact part and the gate contact part shown in FIG. 3.

FIG. 5 shows, as an example, the liquid crystal display panel as the display panel 100.

Referring to FIGS. 3 and 5, the display panel 100 includes a lower substrate 110, an upper substrate 120, and a liquid crystal layer LC. The lower substrate 110 and the upper substrate 120 face each other and the liquid crystal layer LC is disposed between the lower substrate 110 and the upper substrate 120.

The data contact part DT and the gate contact part GT are disposed on the lower substrate 110. The lower substrate 110 includes an insulating substrate SB.

The gate dummy lines GM and the gate lines GL are disposed on the insulating substrate SB. The gate dummy lines GM and the gate lines GL are disposed on (or at) the same layer.

A first insulating layer 113 is formed on the gate lines GL and the gate dummy lines GM. The first insulating layer 113 includes an organic insulating layer or an inorganic insulating layer. The first insulating layer 113 includes a first contact hole CH1 formed therethrough to expose a portion of the gate dummy lines GM in the data contact part DT, and a second contact hole CH2 formed therethrough to expose a portion of the gate lines GL in the gate contact part GT.

The data lines DL and the data dummy lines DM are disposed on the first insulating layer 113. The data lines DL and the data dummy lines DM are disposed on (or at) the same layer.

The data lines DL contact the gate dummy lines GM through the first contact hole CH1 in the data contact part DT. The data dummy lines DM contact the gate lines GL through the second contact hole CH2 in the gate contact part GT.

A second insulating layer 115 is formed on the data lines DL and the data dummy lines DM. The second insulating layer 115 includes an organic insulating layer or an inorganic insulating layer.

FIG. 5 shows a bottom gate structure in which the gate line GL is disposed at a position lower than a position at which the data lines DL is disposed, but the present invention is not limited thereto or thereby. For example, the gate line GL may be disposed at a position higher than a position at which the data line DL is disposed in atop gate structure.

Figure 6:
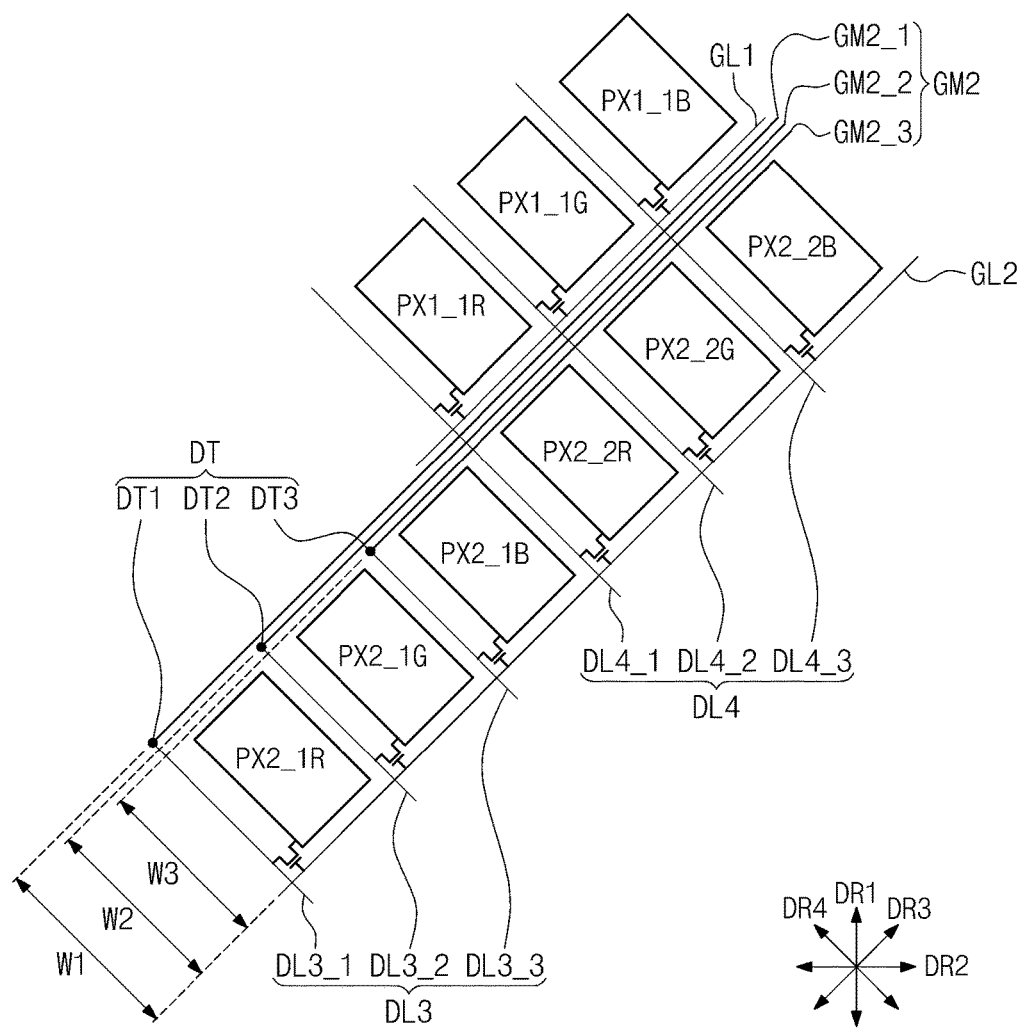
FIG. 6 is a plan view showing pixels coupled to first and second gate lines and third and fourth data lines among pixels shown in FIG. 3.

FIG. 6 is a plan view showing the pixels coupled to the first and second gate lines GL1 and GL2 and the third and fourth data lines DL3 and DL4 among the pixels shown in FIG. 3.

Referring to FIGS. 3, 4, and 6, each of the pixels PX1_1 to PX9_2 includes k sub-pixels ("k" is a natural number greater than or equal to 2). The sub-pixels are disposed to be adjacent to each other in the third direction DR3 along which the gate lines GL extend.

Each of the data lines DL1 to DL10 includes k sub-data lines respectively coupled to the sub-pixels. Each of the gate dummy lines GM1 to GM4 includes k sub-gate dummy lines respectively coupled to the sub-data lines. The sub-gate dummy lines are spaced apart from each other and substantially parallel to each other. The data contact parts DT includes k sub-data contact parts to respectively couple (e.g., connect) the k sub-data lines to the k sub-gate dummy lines.

Hereinafter, the second-row first pixel PX2_1 will be described in more detail with "k" being equal to 3, but the present invention is not limited thereto.

The second-row first pixel PX2_1 includes a first sub-pixel PX2_1R, a second sub-pixel PX2_1G, and a third sub-pixel PX2_1B. The first sub-pixel PX2_1R, the second sub-pixel PX2_1G, and the third sub-pixel PX2_1B may display red, green, and blue colors, respectively. The first-row first pixel PX1_1 includes three sub-pixels PX1_1R, PX1_1G, and PX1_1B, and the second-row second sub-pixel PX2_2 includes three sub-pixels PX2_2R, PX2_2G, and PX2_2B.

The third data line DL3 includes a first sub-data line DL3_1, a second sub-data line DL3_2, and a third sub-data line DL3_3. The first sub-data line DL3_1 is coupled (e.g., connected) to the first sub-pixel PX2_1R, the second sub-data line DL3_2 is coupled to the second sub-pixel PX2_1G, and the third sub-data line DL3_3 is coupled to the third sub-pixel PX2_1B. The first, second, and third sub-data lines DL3_1, DL3_2, and DL3_3 are spaced apart from each other and substantially parallel to each other. The fourth data line DL4 includes three sub-data lines DL4_1, DL4_2, and DL4_3.

The second gate dummy line GM2 includes a first sub-gate dummy line GM2_1, a second sub-gate dummy line GM2_2, and a third sub-gate dummy line GM2_3. The first sub-gate dummy line GM2_1 is coupled to the first sub-data line DL3_1, the second sub-gate dummy line GM2_2 is coupled to the second sub-data line DL3_2, and the third sub-gate dummy line GM2_3 is coupled to the third sub-data line DL3_3.

The data contact parts DT includes a first sub-data contact part DT1, a second sub-data contact part DT2, and a third sub-data contact part DT3. The first sub-data contact part DT1 couples (e.g., connects) the first sub-data line DL3_1 to the first sub-gate dummy line GM2_1. The second sub-data contact part DT2 couples the second sub-data line DL3_2 to the second sub-gate dummy line GM2_2. The third sub-data contact part DT3 couples the third sub-data line DL3_3 to the third sub-gate dummy line GM2_3.

The first sub-gate dummy line GM2_1 has a length longer than that of the second sub-gate dummy line GM2_2, and the second sub-gate dummy line GM2_2 has a length longer than that of the third sub-gate dummy line GM2_3.

Among the gate lines GL, a distance W1 between the second gate line GL2, to which the first, second, and third sub-pixels PX2_1R, PX2_1G, and PX2_1B are coupled (e.g., connected), and the first sub-gate dummy line GM2_1 is greater than a distance W2 between the second gate line GL2 and the second sub-gate dummy line GM2_2. The distance W2 between the second gate line GL2 and the second sub-gate dummy line GM2_2 is greater than a distance W3 between the second gate line GL2 and the third sub-gate dummy line GM2_3.

Figure 7:
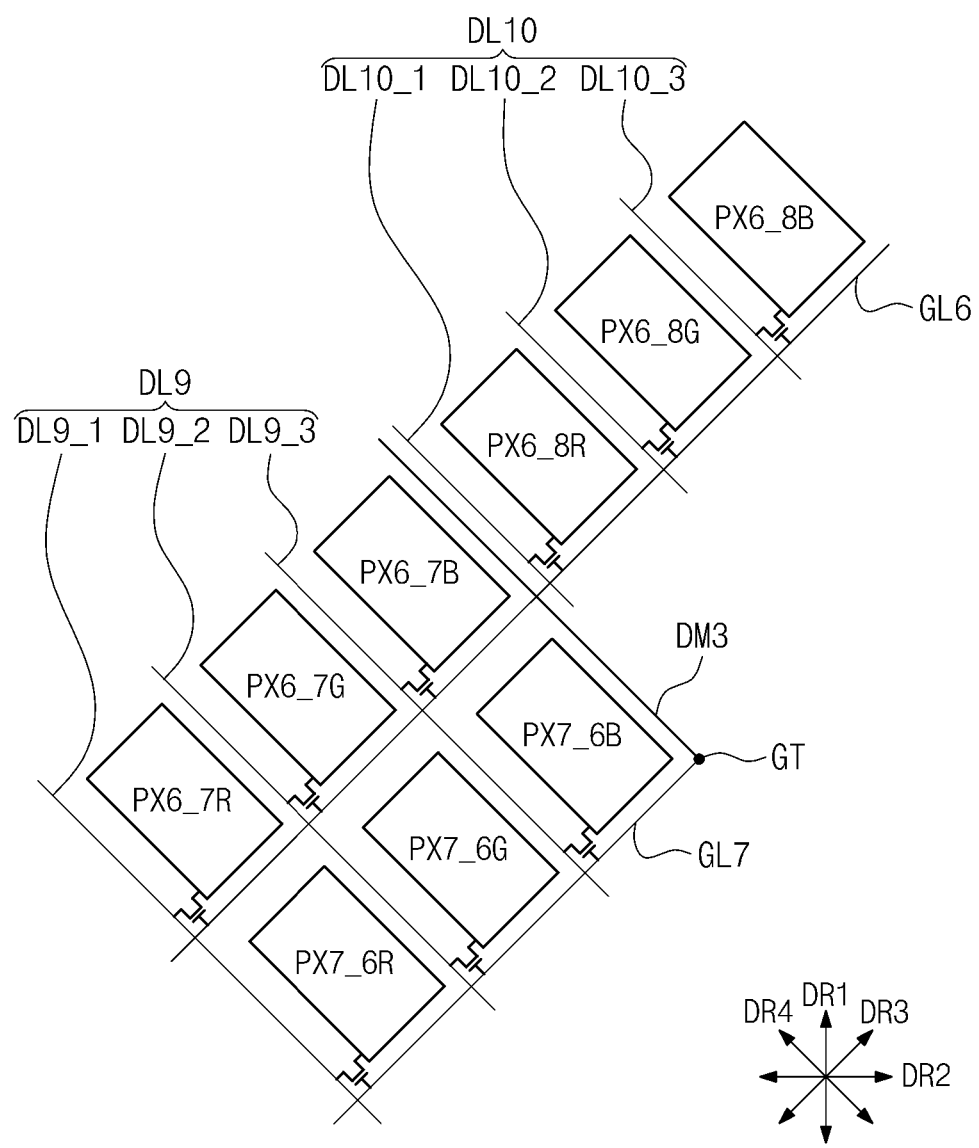
FIG. 7 is a plan view showing pixels coupled to sixth and seventh gate lines and ninth and tenth data lines among pixels shown in FIG. 3.

FIG. 7 is a plan view showing the pixels coupled to the sixth and seventh gate lines GL6 and GL7 and the ninth and tenth data lines DL9 and DL10 among the pixels shown in FIG. 3.

Referring to FIGS. 3, 4, and 7, the sixth-row seventh pixel PX6_7 includes three sub-pixels PX6_7R, PX6_7G, and PX6_7B, the sixth-row eighth pixel PX6-8 includes three sub-pixels PX6_8R, PX6_8G, and PX6_8B, and the seventh-row sixth pixel PX7_6 includes three sub-pixels PX7_6R, PX7_6G, and PX7_6B.

The ninth data line DL9 includes three sub-data lines DL9_1, DL9_2, and DL9_3, and the tenth data line DUO includes three sub-data lines DL10_1, DL10_2, and DL10_3.

The third data dummy line DM3 extends substantially in parallel to the data line DL between the third sub-pixel PX6_7B of the sixth-row seventh pixel PX6_7 and the first sub-pixel PX6_8R of the sixth-row eighth pixel PX6_8, and is coupled to the seventh gate line GL7.

Figure 8:
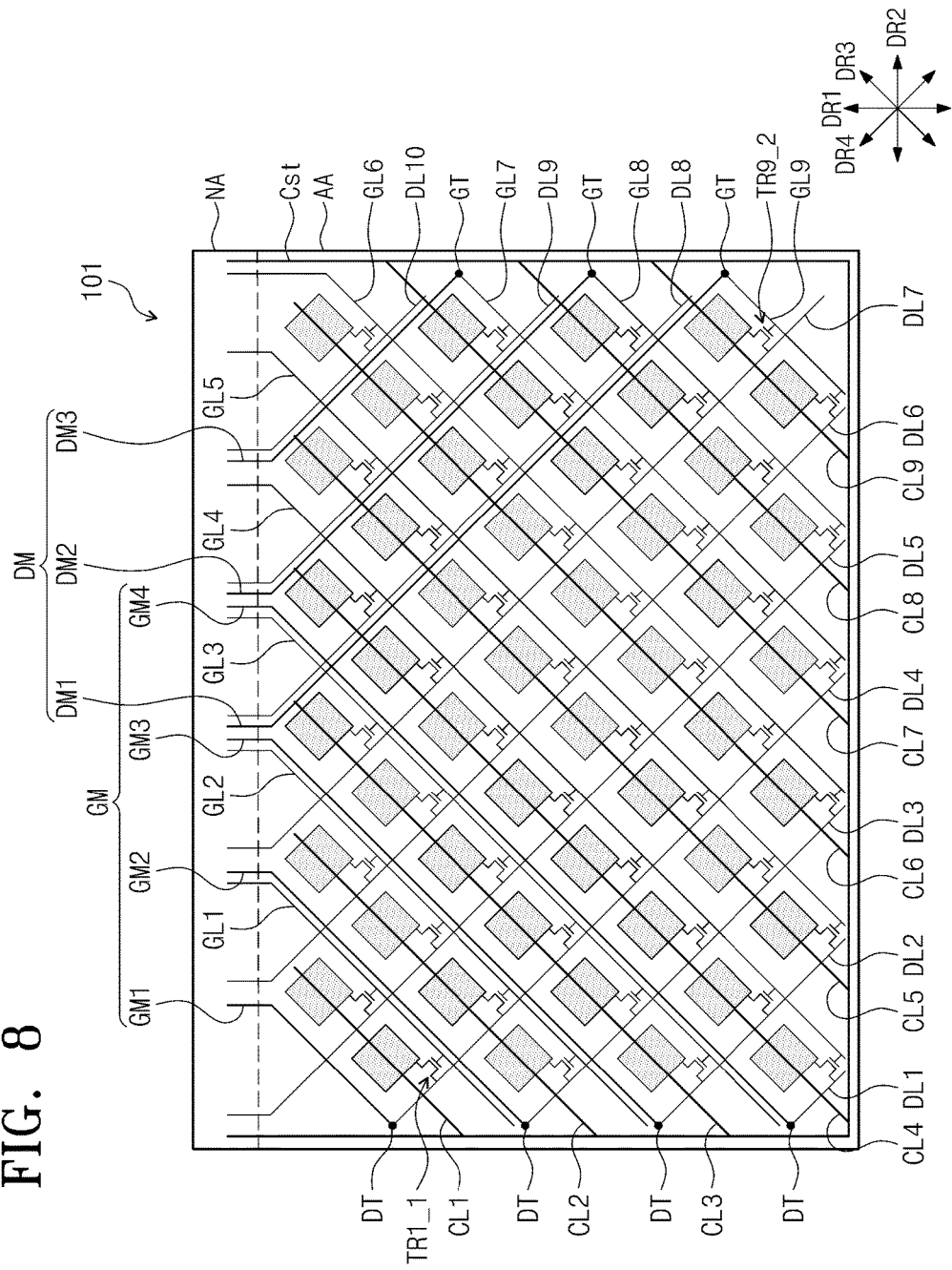
FIG. 8 is a view showing the display panel including a common storage line and a storage line.

FIG. 8 is a view showing a display panel 101 including a common storage line and storage lines.

The display panel 101 has the same or substantially the same structure and function as those of the display panel 100 shown in FIG. 3, except that the display panel 101 further includes the common storage line Cst and the storage lines CL1 to CL9. Hereinafter, the common storage line Cst and the storage lines CL1 to CL9 will be mainly described.

The display panel 101 further includes the common storage line Cst and the storage lines CL1 to CL9.

The common storage line Cst is disposed along three sides of the display area AA, except for one side of the display area AA which is adjacent to the non-display area NA. The common storage line Cst is disposed at the end portion (e.g., at a periphery) of the display area AA to surround the pixels PX1_1 to PX9_2. Ends of the common storage line Cst are disposed in (or at) the non-display area NA, and coupled to the pad part. The common storage line Cst receives a common voltage having a voltage level (e.g., a set or predetermined voltage level).

The storage lines CL1 to CL9 extend substantially in parallel to the gate lines GL, and are spaced apart from the gate lines GL. The storage lines CL1 to CL9 extend along the third direction DR3. The storage lines CL1 to CL9 are disposed to overlap with the pixels PX1_1 to PX9_2. Each of the storage lines CL1 to CL9 is disposed to overlap with a corresponding pixel row. For example, the first storage line CL1 is disposed to overlap with the first pixel row PXR1, and the second storage line CL2 is disposed to overlap with the second pixel row PXR2. Similarly, the ninth storage line CL9 is disposed to overlap with the ninth pixel row PXR9.

At least one end of each of the storage lines CL1 to CL9 is coupled to the common storage line Cst. As shown in FIG. 8, one end of each of the first to sixth storage lines CL1 to CL6 is coupled to the common storage line Cst, and both ends of each of the seventh to ninth storage lines CL7 to CL9 are coupled to the common storage line Cst. The storage lines CL1 to CL9 receive the common voltage through the common storage line Cst.

The data voltage applied to the pixels PX1_1 to PX9_2 is maintained for one frame by a storage capacitor formed by the storage lines CL1 to CL9 and the pixel electrode of each pixel.

According to the example embodiments, the gate lines GL are coupled to the gate dummy lines GM by the data contact parts DT at the one end of the display panel 100 or 101 in the second direction DR2, and the data lines DL are coupled to the data dummy lines DM by the gate contact parts GT at the other end of the display panel 100 or 101 in the second direction DR2. Therefore, the non-display area at the outer portion of the display area AA in the second direction DR2 may be removed or minimized. Consequently, the display panel 100 or 101 includes the non-display area NA on which the pad part is formed at the end in the first direction DR1 of the display panel 100 or 101, and bezels at the other three outer portions of the display area AA may be removed, minimized, or reduced.

Although example embodiments of the present invention have been described, it is understood that the present invention should not be limited to these example embodiments, but that various changes and modifications can be made by one of ordinary skill in the art, without departing from the spirit and scope of the present invention as, defined in the following claims, and their equivalents.

What is claimed is:

1. A display apparatus comprising:
   a display panel including a display area configured to display an image and a non-display area adjacent to a side of the display area in a first direction;
   a timing controller configured to receive a control signal and an input image signal, and to output a first control signal, a second control signal, and a data signal;
   a gate driver configured to generate a gate signal in response to the first control signal, and to apply the gate signal to gate lines from the non-display area; and
   a data driver configured to convert the data signal to a data voltage in response to the second control signal, and to apply the data voltage to data lines from the non-display area,
   wherein the display area comprises:
      the gate lines;
      the data lines crossing the gate lines and insulated from at least a portion of the gate lines;
      gate dummy lines substantially in parallel to the gate lines and spaced from the gate lines;
      data contact parts coupling ends of the gate dummy lines to ends of the data lines at a side of the display panel in a second direction substantially perpendicular to the first direction;
      pixels coupled to the gate lines and the data lines;
      data dummy lines substantially in parallel to the data lines and spaced from the data lines; and
      gate contact parts in contact with ends of the data dummy lines and ends of the gate lines at another side of the display panel in the second direction.

2. The display apparatus of claim 1, wherein the gate dummy lines are at a same layer as the gate lines.

3. The display apparatus of claim 1, wherein one of the gate dummy lines coupled to one of the data lines by one of the data contact parts is overlapped with the one of the data lines when viewed in a plan view.

4. The display apparatus of claim 1, wherein one end of each of the gate dummy lines is respectively coupled to the data contact parts, another end of each of the gate dummy lines is at the non-display area, one end of each of the data dummy lines is respectively coupled to the gate contact parts, and another end of each of the data dummy lines is at the non-display area.

5. The display apparatus of claim 1, wherein the data dummy lines are at a same layer as the data lines.

6. The display apparatus of claim 1, wherein one of the data dummy lines coupled to one of the gate lines by one of the gate contact parts is overlapped with the one of the gate lines when viewed in a plan view.

7. The display apparatus of claim 1, wherein the pixels coupled to one gate line or one data line among the pixels is defined as a pixel row, the display area further comprises a plurality of areas each of the areas being divided into a plurality of pixel rows that are consecutively arranged, and a number of the pixels included in one pixel row is different from a number of the pixels included in another pixel row in at least one area from among the areas.

8. The display apparatus of claim 7, wherein the pixel row comprises a gate pixel row including the pixels coupled to one gate line, and the gate dummy line between an n-th gate pixel row (n is a natural number) and an (n+1)th gate pixel row from among the gate dummy lines is coupled to the data line coupled to a first pixel of the (n+1)th gate pixel row from among the data lines.

9. The display apparatus of claim 7, wherein the pixel row comprises a data pixel row including the pixels coupled to one data line, and the data dummy line between an n-th data pixel row (n is a natural number) and an (n+1)th data pixel row from among the data dummy lines is coupled to the gate line coupled to a last pixel of the (n+1)th data pixel row from among the gate lines.

10. The display apparatus of claim 7, wherein the plurality of areas comprise:
    an increase area in which the number of the pixels included in each pixel row of the increase area increases every at least one pixel row;
    a maintain area in which the number of the pixels included in each pixel row of the maintain area is constant; and
    a decrease area in which the number of the pixels included in each pixel row of the decrease area decreases every at least one pixel row.

11. The display apparatus of claim 1, wherein each of the pixels comprises k (k is a natural number greater than or equal to 2) sub-pixels, each of the data lines comprises k sub-data lines, each of the gate dummy lines comprises k sub-gate dummy lines respectively coupled to the sub-data lines, and the data contact parts comprise k sub-data contact parts to couple the k sub-data lines to the k sub-gate dummy lines, respectively.

12. The display apparatus of claim 11, wherein the sub-pixels are adjacent to each other in a same direction as a direction along which the gate lines extend.

13. The display apparatus of claim 11, wherein the sub-gate dummy lines are spaced from each other and substantially in parallel to each other.

14. The display apparatus of claim 11, wherein:
    the sub-pixels comprise a first sub-pixel, a second sub-pixel, and a third sub-pixel;
    the sub-data lines comprise a first sub-data line coupled to the first sub-pixel, a second sub-data line coupled to the second sub-pixel, and a third sub-data line coupled to the third sub-pixel;
    the sub-gate dummy lines comprise a first sub-gate dummy line coupled to the first sub-data line, a second sub-gate dummy line coupled to the second sub-data line, and a third sub-gate dummy line coupled to the third sub-data line; and
    the sub-data contact part comprise a first sub-data contact part to couple the first sub-data line to the first sub-gate dummy line, a second sub-data contact part to couple the second sub-data line to the second sub-gate dummy line, and a third sub-data contact part to couple the third sub-data line to the third sub-gate dummy line.

15. The display apparatus of claim 14, wherein the first, second, and third sub-pixels are sequentially arranged, the first sub-gate dummy line is longer than the second sub-gate dummy line, and the second sub-gate dummy line is longer than the third sub-gate dummy line.

16. The display apparatus of claim 15, wherein a distance between the gate line coupled to the first, second, and third sub-pixels and the first sub-gate dummy line is greater than a distance between the gate line coupled to the first, second, and third sub-pixels and the second sub-gate dummy line, and a distance between the gate line coupled to the first, second, and third sub-pixels and the second sub-gate dummy line is greater than a distance between the gate line coupled to the first, second, and third sub-pixels and the third sub-gate dummy line.

17. The display apparatus of claim 1, wherein the display panel further comprises:
a common storage line along an outer portion of the display area and configured to receive a common voltage; and
storage lines coupled to the common storage line, extending substantially in parallel to the gate lines, and spaced from the gate lines.

18. The display apparatus of claim 17, wherein each of the storage lines overlaps with a pixel row including the pixels coupled to one gate line.

19. A display apparatus comprising:
a display panel including a display area configured to display an image and a non-display area adjacent to a side of the display area in a first direction;
a timing controller configured to receive a control signal and an input image signal, and to output a first control signal, a second control signal, and a data signal;
a gate driver configured to generate a gate signal in response to the first control signal, and to apply the gate signal to gate lines from the non-display area; and
a data driver configured to convert the data signal to a data voltage in response to the second control signal, and to apply the data voltage to data lines from the non-display area,
wherein the display area comprises:
the gate lines;
the data lines crossing the gate lines and insulated from at least a portion of the gate lines;
gate dummy lines substantially in parallel to the gate lines and spaced from the gate lines;
data contact parts coupling the gate dummy lines to the data lines at a side of the display panel in a second direction substantially perpendicular to the first direction; and
pixels coupled to the gate lines and the data lines,
wherein the display panel comprises two sides respectively extending along the first and second directions, the gate lines extend along a third direction crossing the first and second directions, and the data lines extend along a fourth direction crossing the first, second, and third directions.

20. A display panel comprising:
a display area configured to display an image; and
a non-display area adjacent to a side of the display area in a first direction, the display area comprising:
gate lines;
data lines crossing the gate lines and insulated from at least a portion of the gate lines;
gate dummy lines substantially in parallel to the gate lines and spaced from the gate lines;
data contact parts coupling ends of the gate dummy lines and ends of the data lines at a side of the display panel in a second direction substantially perpendicular to the first direction; and
pixels coupled to the gate lines and the data lines,
wherein the data contact parts are in contact with the ends of the gate dummy lines and the ends of the data lines.

21. The display panel of claim 20, wherein the gate dummy lines are at a same layer as the gate lines.

22. The display panel of claim 20, wherein one of the gate dummy lines coupled to one of the data lines by one of the data contact parts is overlapped with the one of the data lines when viewed in a plan view.

23. The display panel of claim 20, wherein the display area further comprises:
data dummy lines substantially in parallel to the data lines and spaced from the data lines; and
gate contact parts coupling the data dummy lines to the gate lines at another side of the display panel in the second direction.

24. The display panel of claim 23, wherein one end of each of the gate dummy lines is respectively coupled to the data contact parts, another end of each of the gate dummy lines is at the non-display area, one end of each of the data dummy lines is respectively coupled to the gate contact parts, and another end of each of the data dummy lines is at the non-display area.

25. The display panel of claim 23, wherein the data dummy lines are at a same layer as the data lines.

26. The display panel of claim 23, wherein one of the data dummy lines coupled to one of the gate lines by one of the gate contact parts is overlapped with the one of the gate lines when viewed in a plan view.

* * * * *